United States Patent
Schwarz et al.

(10) Patent No.: US 9,897,001 B2
(45) Date of Patent: Feb. 20, 2018

(54) COMPRESSOR AREAS FOR HIGH OVERALL PRESSURE RATIO GAS TURBINE ENGINE

(71) Applicant: United Technologies Corporation, Hartford, CT (US)

(72) Inventors: Frederick M. Schwarz, Glastonbury, CT (US); Stephen G. Pixton, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 378 days.

(21) Appl. No.: 14/620,395

(22) Filed: Feb. 12, 2015

(65) Prior Publication Data

US 2015/0252723 A1 Sep. 10, 2015

Related U.S. Application Data

(60) Provisional application No. 61/947,502, filed on Mar. 4, 2014.

(51) Int. Cl.
F02C 3/107 (2006.01)
F02C 3/067 (2006.01)
F02C 7/36 (2006.01)

(52) U.S. Cl.
CPC .............. F02C 3/107 (2013.01); F02C 3/067 (2013.01); F02C 7/36 (2013.01); F05D 2250/44 (2013.01); F05D 2260/4031 (2013.01)

(58) Field of Classification Search
CPC .. F02C 3/067; F02C 3/107; F02C 7/36; F05D 2250/44; F05D 2260/4031

(Continued)

(56) References Cited

U.S. PATENT DOCUMENTS

2012/0171018 A1 7/2012 Hasel et al.
2012/0275922 A1* 11/2012 Praisner ................. F01D 9/041
416/223 A (Continued)

FOREIGN PATENT DOCUMENTS

WO 2015047449 A1 4/2015

OTHER PUBLICATIONS

European Search Report for European Patent Application No. 15157534.7 dated Jul. 31, 2015.

*Primary Examiner* — William McCalister
(74) *Attorney, Agent, or Firm* — Carlson, Gaskey & Olds, P.C.

(57) ABSTRACT

A gas turbine engine comprises a high pressure turbine rotor, an intermediate pressure turbine rotor and a fan drive turbine rotor. The fan drive turbine rotor drives a fan rotor through a gear reduction. The intermediate pressure rotor drives a low pressure compressor rotor and the high pressure turbine rotor drives a high pressure compressor rotor. A first flow cross-sectional area is between an outer periphery of a hub in the low pressure compressor rotor, and an outer tip of an upstream most blade row of the low pressure compressor rotor. A second flow cross-sectional area is between an outer periphery of a hub in the high pressure compressor rotor, and an outer tip of an upstream most blade row of the high pressure compressor rotor. A ratio of the first and second flow cross-sectional areas is greater than or equal to about 0.12 and less than or equal to about 0.33.

20 Claims, 1 Drawing Sheet

(58) Field of Classification Search
USPC .................................................... 415/122.1
See application file for complete search history.

(56) References Cited

U.S. PATENT DOCUMENTS

| | | |
|---|---|---|
| 2013/0192196 A1 | 8/2013 | Suciu et al. |
| 2013/0259650 A1 | 10/2013 | Schwarz et al. |
| 2014/0130479 A1* | 5/2014 | Schwarz .................. F02C 7/06 |
| | | 60/226.3 |

* cited by examiner

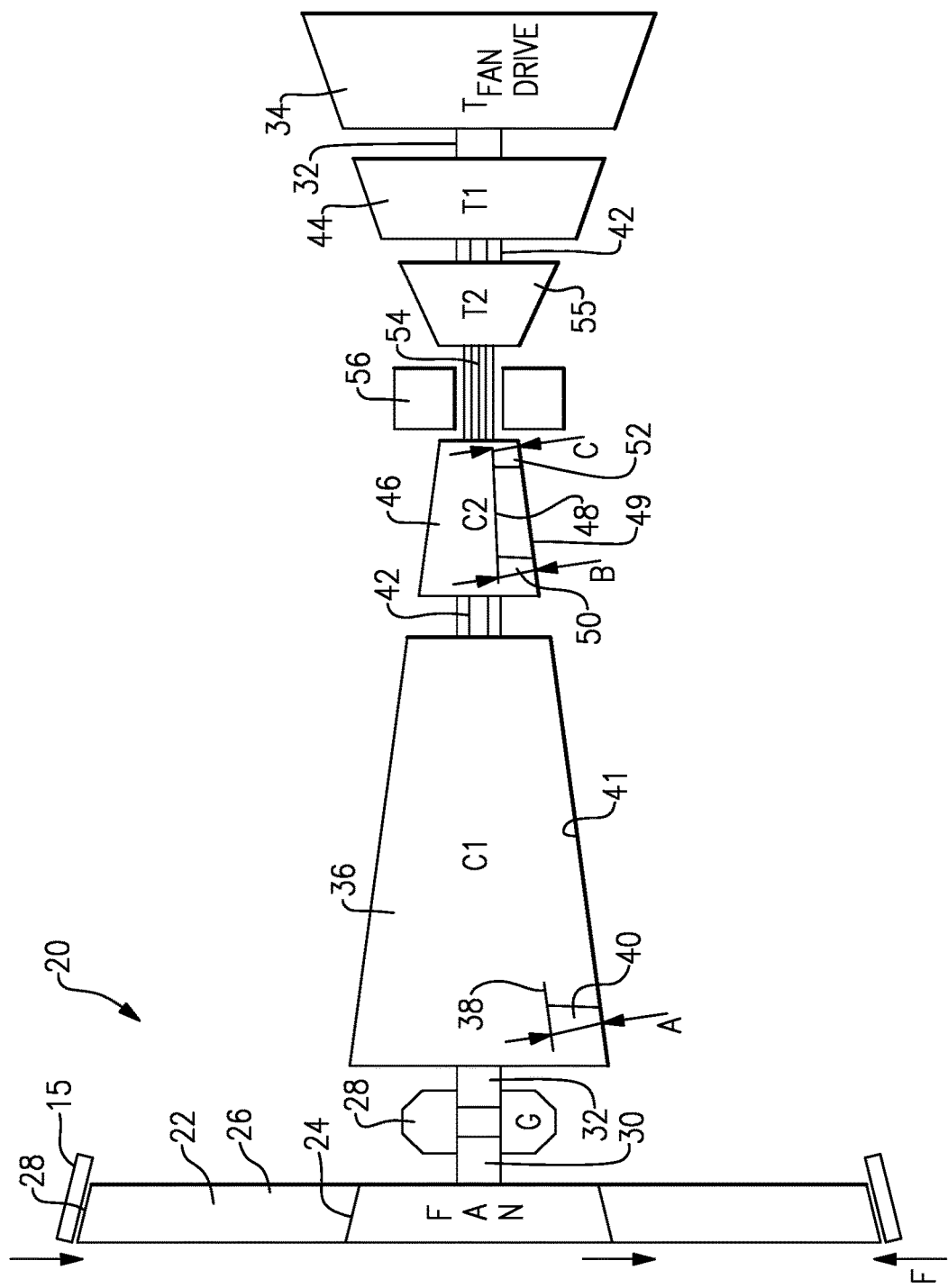

9,897,001 B2

COMPRESSOR AREAS FOR HIGH OVERALL PRESSURE RATIO GAS TURBINE ENGINE

CROSS-REFERENCE TO RELATED APPLICATION

This application claims priority to U.S. Provisional Patent Application No. 61/947,502, filed Mar. 4, 2014.

BACKGROUND OF THE INVENTION

This application relates to the respective flow areas between a fan and a pair of compressor sections in a gas turbine engine having three turbine rotors.

Gas turbine engines are known and, typically, include a fan delivering air into a compressor. The air is compressed in the compressor and delivered into a combustion section where it is mixed with fuel and ignited. Products of this combustion pass downstream over turbine rotors driving them to rotate.

In one known type of gas turbine engine, there are three turbine rotors. A highest pressure turbine rotor and an intermediate pressure turbine rotor each drive compressor stages.

The high pressure compressor rotor has typically been relied upon to develop a good deal of an overall pressure ratio across the two compressor rotors. The downstream end of this high pressure compressor rotor is a challenging location within the gas turbine engine, as it must be able to withstand the temperatures and stresses it will see due to these high pressures.

A fan drive turbine has been provided which drives a fan. Historically, the two rotated at a common speed. More recently, it has been proposed to include a gear reduction such that the fan can rotate at slower speeds than the fan drive turbine rotor.

SUMMARY OF THE INVENTION

In a featured embodiment, a gas turbine engine comprises a high pressure turbine rotor, an intermediate pressure turbine rotor and a fan drive turbine rotor. The fan drive turbine rotor drives a fan rotor through a gear reduction. The intermediate pressure rotor drives a low pressure compressor rotor and the high pressure turbine rotor drives a high pressure compressor rotor. A first flow cross-sectional area is between an outer periphery of a hub in the low pressure compressor rotor, and an outer tip of an upstream most blade row of the low pressure compressor rotor. A second flow cross-sectional area is between an outer periphery of a hub in the high pressure compressor rotor, and an outer tip of an upstream most blade row of the high pressure compressor rotor. A ratio of the second flow cross-sectional area to the first flow cross-sectional area is greater than or equal to about 0.12 and less than or equal to about 0.33.

In another embodiment according to the previous embodiment, a fan flow cross-sectional area is defined between an outer tip of fan blades and an outer periphery of a fan hub. A ratio of the fan flow cross-sectional area to the first flow cross-sectional area is greater than or equal to about 11 and less than or equal to about 20.

In another embodiment according to any of the previous embodiments, the high pressure compressor has a downstream most vane row and an exit cross-sectional area defined between the outer periphery of the hub, and an inner periphery of a housing surrounding the high pressure compressor rotor at the downstream most vane row. A ratio of the exit cross-sectional area to the second cross-sectional flow area is greater than or equal to about 0.25 and less than or equal to about 0.6.

In another embodiment according to any of the previous embodiments, a ratio of the exit cross-sectional area to the first flow cross-sectional area is greater than or equal to 0.0667 and less than or equal to 0.125.

In another embodiment according to any of the previous embodiments, a gear ratio of the gear reduction is greater than or equal to about 2.6.

In another embodiment according to any of the previous embodiments, the low pressure compressor rotor has 6 to 14 stages.

In another embodiment according to any of the previous embodiments, the high pressure compressor rotor has 4 to 7 stages.

In another embodiment according to any of the previous embodiments, a total stage count across the high and low pressure compressor rotors is 10 to 21.

In another embodiment according to any of the previous embodiments, the high pressure compressor has a downstream most vane row and an exit cross-sectional area defined between the outer periphery of the hub, and an inner periphery of a housing surrounding the high pressure compressor rotor at the downstream most vane row. A ratio of the exit cross-sectional area to the second cross-sectional area is greater than or equal to about 0.25 and less than or equal to about 0.6.

In another embodiment according to any of the previous embodiments, a ratio of the exit cross-sectional area to the first flow cross-sectional area is greater than or equal to 0.0667 and less than or equal to 0.125.

In another embodiment according to any of the previous embodiments, a gear ratio of the gear reduction is greater than or equal to about 2.6.

In another embodiment according to any of the previous embodiments, the low pressure compressor rotor has 6 to 14 stages.

In another embodiment according to any of the previous embodiments, the high pressure compressor rotor has 4 to 7 stages.

In another embodiment according to any of the previous embodiments, a total stage count across the high and low pressure compressor rotors is 10 to 21.

In another embodiment according to any of the previous embodiments, the high pressure compressor has a downstream most vane row and an exit cross-sectional area defined between the outer periphery of the hub, and an inner periphery of a housing surrounding the high pressure compressor rotor at the downstream most vane row. A ratio of the exit cross-sectional area to the first flow cross-sectional area is greater than or equal to 0.0667 and less than or equal to 0.125.

In another embodiment according to any of the previous embodiments, a gear ratio of the gear reduction is greater than or equal to about 2.6.

In another embodiment according to any of the previous embodiments, the low pressure compressor rotor has 6 to 14 stages.

In another embodiment according to any of the previous embodiments, the high pressure compressor rotor has 4 to 7 stages.

In another embodiment according to any of the previous embodiments, a total stage count across the high and low pressure compressor rotors is 10 to 21.

In another embodiment according to any of the previous embodiments, a total stage count across the high and low pressure compressor rotors is 10 to 21.

These and other features may be best understood from the following drawings and specification.

BRIEF DESCRIPTION OF THE DRAWING

FIG. 1 schematically shows a gas turbine engine.

DETAILED DESCRIPTION

An engine 20 is illustrated in FIG. 1. A fan section 22 includes a hub 24 and radially outwardly extending blades 26 which extend to a radially outer end 28. A housing 15 encloses the blades 26.

A fan flow area F is defined between an outer periphery of the fan rotor 24 and inwardly of the outer tip 28.

A fan shaft 30 is driven through a gear reduction 28 by a shaft 32. The shaft 32 is, in turn, driven by a fan drive turbine rotor 34.

A low pressure compressor rotor 36 includes a hub 38 and radially outwardly extending blades 40. An upstream most of the blades defines a flow cross-sectional area A between an outer periphery of the hub 38 and an inner periphery 41 of an outer housing or an outer tip of the blade. A shaft 42 drives compressor rotor 36 and is, in turn, driven by an intermediate turbine rotor 44.

A high pressure compressor rotor 46 includes a hub 48 and an upstream most blade row 50. A flow cross-sectional area B is defined between an outer periphery of the hub 48 and an inner periphery 49 of a housing, or an outer tip of blades 50.

A downstream most exit vane row 52 defines a flow cross-sectional area C, again, between an outer periphery of the hub 48 and an inner periphery 49 of the housing. A shaft 54 drives a compressor rotor 56 through a turbine rotor 55.

Areas F, A and B are taken at a blade leading edge. Area C is taken at a vane trailing edge.

A combustor section 56 is positioned between the compressor rotor 46 and the turbine rotor 55.

While three turbine rotors are shown, additional turbine rotors could be utilized within gas turbine engines that come within the scope of this disclosure.

It is desirable to achieve very high pressure ratios or air compression across the compressor rotors 36 and 46. However, limitations are generally found at the rear of the high pressure compressor 46 and, in particular, adjacent the location of vane row 52. High stresses and high temperatures at this location provide limits on the overall pressure ratio that can generally be achieved.

In this disclosure, more of the work is done in the low pressure compressor 36. This will allow the high pressure compressor rotor 46 to be driven at a slower speed, while still achieving overall higher pressure ratios. This increases the temperature capability at the downstream end (vanes 52) of the compressor rotor 46.

The disclosed engine has particular application with longer range aircraft, such as twin aisle aircraft. Such aircraft are typically provided as twin-engine aircraft and with engines with thrust rated above 50,000 lbs. at 86° F. and providing thrust of up to 130,000 lbs. Fuel burn at cruise conditions is of paramount importance for this type of long range aircraft, as opposed to shorter range single aisle aircraft where fuel burn might be sacrificed to some extent in favor of a compromise of fuel burn and maintenance reduction.

For the disclosed engine, fuel burn improvements can be achieved by providing a very high overall pressure ratio. Further, the high pressure compressor rotor 46 operates quite efficiently as does the compressor rotor 36. All of this is achieved by preferred ratios of the several flow areas as disclosed.

In embodiments, the gear ratio of the gear reduction 28 is greater than or equal to about 2.6. In the compressor rotor 36, there are 6 to 14 stages. In the compressor rotor 46, there are 4 to 7 stages. In total, there are 10 to 21 stages across the two rotors 36 and 46.

A ratio of flow area F to flow area A is greater than or equal to about 11 and less than or equal to about 20.

A ratio of flow area B to flow area A is greater than or equal to about 0.12 and less than or equal to about 0.33. A ratio of flow area C to flow area B is greater than or equal to about 0.25 and less than or equal to about 0.06. A ratio of the flow area C to flow area A is greater than or equal to about 0.0667 and less than or equal to about 0.125.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a high pressure turbine rotor, an intermediate pressure turbine rotor and a fan drive turbine rotor, said fan drive turbine rotor driving a fan rotor through a gear reduction, said intermediate pressure rotor driving a low pressure compressor rotor and said high pressure turbine rotor driving a high pressure compressor rotor,
   a first flow cross-sectional area between an outer periphery of a hub in said low pressure compressor rotor, and an outer tip of an upstream most blade row of said low pressure compressor rotor; a second flow cross-sectional area between an outer periphery of a hub in said high pressure compressor rotor, and an outer tip of an upstream most blade row of said high pressure compressor rotor; and
   a ratio of said second flow cross-sectional area to said first flow cross-sectional area being greater than or equal to 0.12 and less than or equal to 0.33.

2. The gas turbine engine as set forth in claim 1, wherein a fan flow cross-sectional area is defined between an outer tip of fan blades and an outer periphery of a fan hub, and a ratio of said fan flow cross-sectional area to said first flow cross-sectional area being greater than or equal to 11 and less than or equal to 20.

3. The gas turbine engine as set forth in claim 2, wherein said high pressure compressor having a downstream most vane row and an exit cross-sectional area defined between said outer periphery of said hub, and an inner periphery of a housing surrounding said high pressure compressor rotor at said downstream most vane row, and a ratio of said exit cross-sectional area to said second cross-sectional flow area being greater than or equal to 0.25 and less than or equal to 0.6.

4. The gas turbine engine as set forth in claim 3, wherein a ratio of said exit cross-sectional area to said first flow cross-sectional area being greater than or equal to 0.0667 and less than or equal to 0.125.

5. The gas turbine engine as set forth in claim 4, wherein a gear ratio of said gear reduction being greater than or equal to 2.6.

6. The gas turbine engine as set forth in claim 5, wherein said low pressure compressor rotor having 6 to 14 stages.

7. The gas turbine engine as set forth in claim 6, wherein said high pressure compressor rotor having 4 to 7 stages.

8. The gas turbine engine as set forth in claim 7, wherein a total stage count across the high and low pressure compressor rotors being 10 to 21.

9. The gas turbine engine as set forth in claim 1, wherein said high pressure compressor having a downstream most vane row and an exit cross-sectional area defined between said outer periphery of said hub, and an inner periphery of a housing surrounding said high pressure compressor rotor at said downstream most vane row, and a ratio of said exit cross-sectional area to said second cross-sectional area being greater than or equal to 0.25 and less than or equal to 0.6.

10. The gas turbine engine as set forth in claim 9, wherein a ratio of said exit cross-sectional area to said first flow cross-sectional area being greater than or equal to 0.0667 and less than or equal to 0.125.

11. The gas turbine engine as set forth in claim 10, wherein a gear ratio of said gear reduction being greater than or equal to 2.6.

12. The gas turbine engine as set forth in claim 11, wherein said low pressure compressor rotor having 6 to 14 stages.

13. The gas turbine engine as set forth in claim 12, wherein said high pressure compressor rotor having 4 to 7 stages.

14. The gas turbine engine as set forth in claim 13, wherein a total stage count across the high and low pressure compressor rotors being 10 to 21.

15. The gas turbine engine as set forth in claim 1, wherein said high pressure compressor having a downstream most vane row and an exit cross-sectional area defined between said outer periphery of said hub, and an inner periphery of a housing surrounding said high pressure compressor rotor at said downstream most vane row, and a ratio of said exit cross-sectional area to said first flow cross-sectional area being greater than or equal to 0.0667 and less than or equal to 0.125.

16. The gas turbine engine as set forth in claim 1, wherein a gear ratio of said gear reduction being greater than or equal to 2.6.

17. The gas turbine engine as set forth in claim 1, wherein said low pressure compressor rotor having 6 to 14 stages.

18. The gas turbine engine as set forth in claim 1, wherein said high pressure compressor rotor having 4 to 7 stages.

19. The gas turbine engine as set forth in claim 18, wherein a total stage count across the high and low pressure compressor rotors being 10 to 21.

20. The gas turbine engine as set forth in claim 1, wherein a total stage count across the high and low pressure compressor rotors being 10 to 21.

* * * * *